US009043094B2

(12) United States Patent
 Wellhoefer et al.

(10) Patent No.: US 9,043,094 B2
(45) Date of Patent: May 26, 2015

(54) ASSEMBLY FOR COUPLING A TOWING VEHICLE TO A TRAILER

(75) Inventors: Matthias Marcus Wellhoefer, Stuttgart (DE); Stefanie Siefke, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/122,191

(22) PCT Filed: Mar. 29, 2012

(86) PCT No.: PCT/EP2012/055705
§ 371 (c)(1),
(2), (4) Date: Feb. 26, 2014

(87) PCT Pub. No.: WO2012/159805
PCT Pub. Date: Nov. 29, 2012

(65) Prior Publication Data
US 2014/0195124 A1  Jul. 10, 2014

(30) Foreign Application Priority Data
May 24, 2011 (DE) .......................... 10 2011 076 392

(51) Int. Cl.
*B60D 1/24* (2006.01)
*B60D 1/30* (2006.01)
*B60W 30/00* (2006.01)

(52) U.S. Cl.
CPC ............ *B60D 1/24* (2013.01); *B60D 1/248* (2013.01); *B60D 1/30* (2013.01); *B60W 30/00* (2013.01)

(58) Field of Classification Search
None
See application file for complete search history.

(56) References Cited

U.S. PATENT DOCUMENTS

| 5,811,738 | A | * | 9/1998 | Boyovich et al. ............. 177/136 |
| 6,053,521 | A | * | 4/2000 | Schertler ....................... 280/511 |
| 6,769,315 | B2 | * | 8/2004 | Stevenson et al. ........ 73/862.629 |
| 8,380,390 | B2 | * | 2/2013 | Sy et al. ........................... 701/36 |
| 2006/0206253 | A1 | * | 9/2006 | Yu .................................... 701/70 |
| 2006/0290102 | A1 | * | 12/2006 | VanBuskirk, Jr. ............. 280/511 |
| 2008/0036296 | A1 | * | 2/2008 | Wu et al. ....................... 303/146 |
| 2009/0014982 | A1 | * | 1/2009 | Wulff ............................. 280/477 |
| 2010/0114437 | A1 | * | 5/2010 | Boss et al. ....................... 701/48 |
| 2011/0029210 | A1 | * | 2/2011 | Wu et al. ......................... 701/70 |
| 2011/0172875 | A1 | * | 7/2011 | Gibbs ............................. 701/33 |

(Continued)

FOREIGN PATENT DOCUMENTS

| DE | 10030128 | 1/2002 |
| DE | 102006004963 | 7/2007 |
| DE | 202007008391 | 8/2007 |
| DE | 102006030001 | 1/2008 |

(Continued)

OTHER PUBLICATIONS

International Search Report for PCT/EP2012/055705, issued on Oct. 8, 2012.

*Primary Examiner* — Jonathan M Dager
(74) *Attorney, Agent, or Firm* — Kenyon & Kenyon LLP

(57) ABSTRACT

An assembly is described for coupling a towing vehicle to a trailer having a towing vehicle-side coupling unit and a trailer-side coupling unit. A measuring device, which records and analyzes the force acting on the towing vehicle-side coupling unit in at least one direction, is assigned to the towing vehicle-side coupling unit. The measuring device is coupled to a vehicle immobilizer that prevents the towing vehicle from starting and/or being set in motion in response to the force recorded by the measuring device and/or a physical quantity derived therefrom exceeding a predefined threshold value.

10 Claims, 1 Drawing Sheet

(56) References Cited

U.S. PATENT DOCUMENTS

| | | | |
|---|---|---|---|
| 2012/0012405 A1* | 1/2012 | Menon et al. | 177/136 |
| 2012/0209502 A1* | 8/2012 | Nichols et al. | 701/124 |
| 2013/0035839 A1* | 2/2013 | Otanez et al. | 701/102 |
| 2013/0253814 A1* | 9/2013 | Wirthlin | 701/124 |

FOREIGN PATENT DOCUMENTS

| | | |
|---|---|---|
| DE | 102009034678 | 1/2011 |
| DE | 102009053266 | 5/2011 |
| EP | 2280263 | 2/2011 |
| WO | WO2011050796 | 5/2011 |

\* cited by examiner

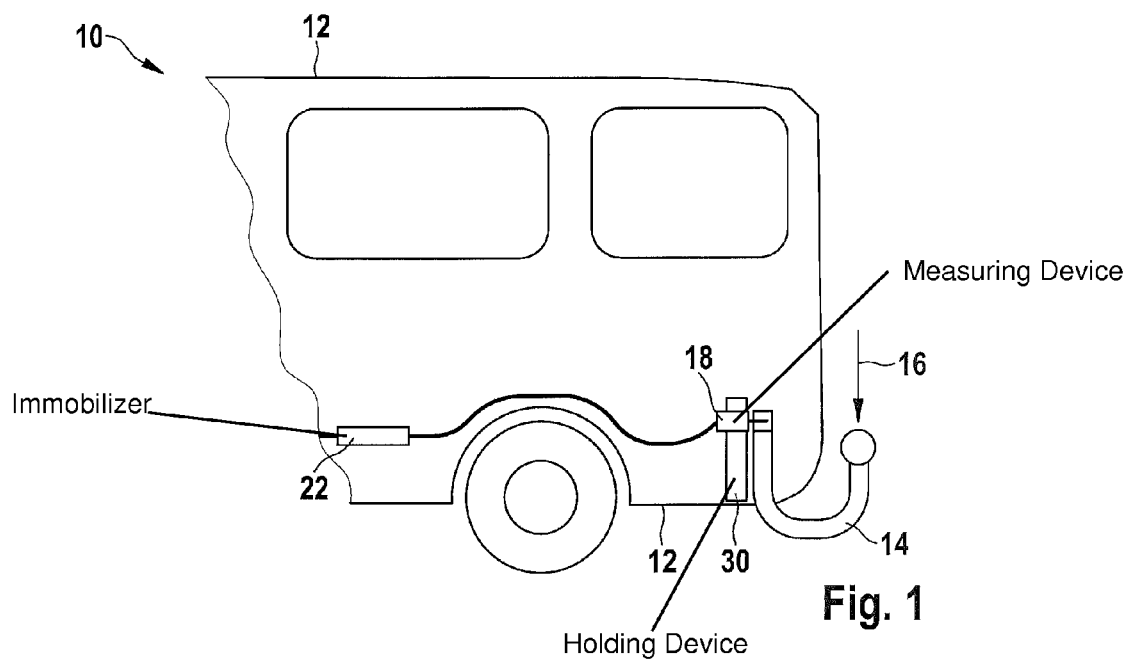
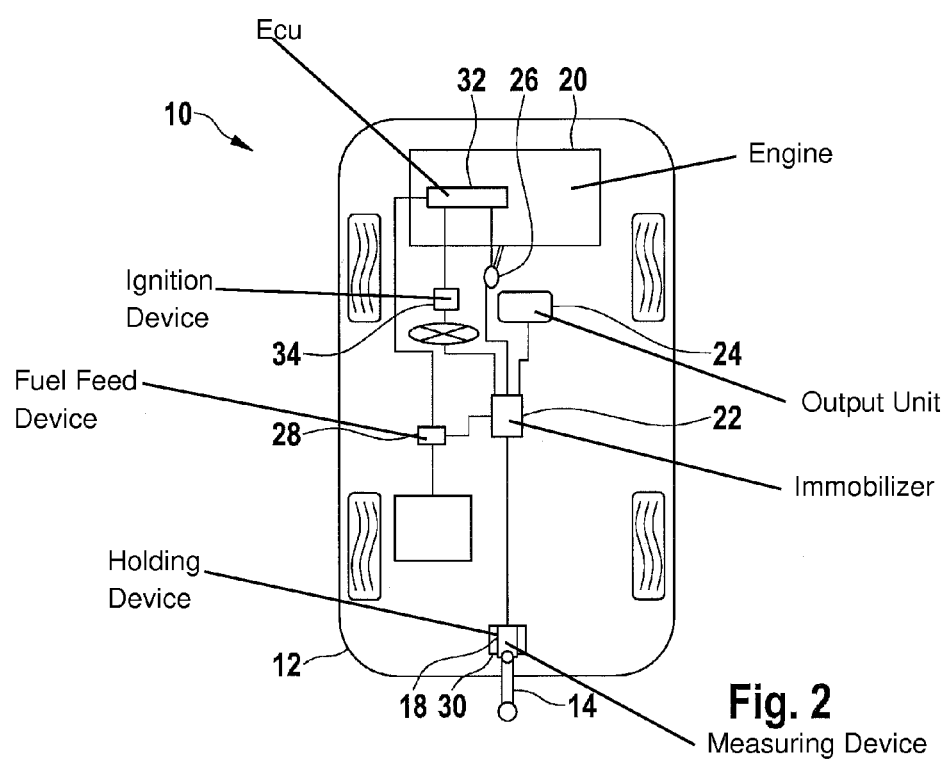

ASSEMBLY FOR COUPLING A TOWING VEHICLE TO A TRAILER

FIELD OF THE INVENTION

The present invention relates to an assembly for coupling a towing vehicle to a trailer.

BACKGROUND INFORMATION

German Published Patent Application No. 10 2006 030 001 describes an assembly for coupling a towing vehicle to a trailer, for example, that has a towing vehicle-side coupling unit and a trailer-side coupling unit. In the case of the described coupling assembly, the towing vehicle-side coupling unit has a measuring device assigned thereto that records and analyzes the force acting on the towing vehicle-side coupling unit in at least one direction.

German Patent No. 20 2007 008 391 describes an assembly for coupling a towing vehicle, such as an automobile, to a trailer, such as a caravan, for example. The described coupling assembly includes a trailer coupling where a ball socket provided on the trailer drawbar can be brought into swiveling engagement with a tow hook configured on the towing vehicle and having a spherical coupling part as a mating part. A measuring device is integrated in the ball-type trailer coupling in order to determine the load weights of the trailer's drawbar.

The German Patent Application DE 10 2006 004 963 A1 describes an assembly for coupling a towing vehicle to a trailer, for example, that includes a trailer coupling. To record the forces occurring during pulling of the load, the trailer coupling is provided with a measuring device. The measuring device includes a first component and a second component. The first component is movably disposed relative to the second component counter to the force of a spring device, the spring device having an axially symmetric design. The position of the first component relative to the second component can be ascertained inductively and/or capacitively and/or in accordance with the eddy current principle.

German Published Patent Application No. 100 30 128 describes an assembly for coupling a towing vehicle to a trailer, for example, where the trailer is hitched to the towing vehicle via a drawbar. The towing vehicle and the trailer make up a vehicle system, where a sensor system is provided to avoid dynamic driving instabilities in the towing vehicle by recording differences between the driver's desired direction of travel and the actual movement of the vehicle; a difference between the setpoint and actual movement resulting in individual trailer axle wheels being braked. In response to braking of the trailer, the combined vehicle and trailer system is stretched, the intention being to thereby significantly reduce the danger of buckling in the drawbar joint.

SUMMARY

In contrast, the assembly according to the present invention for coupling a towing vehicle to a trailer has the advantage that the measuring device is coupled to a vehicle immobilizer that prevents the towing vehicle from starting and/or being set in motion in response to the force recorded by the measuring device and/or a physical quantity derived therefrom exceeding a predefined threshold value. The driver of the vehicle advantageously receives information prior to start-up of the vehicle as to whether the measured trailer load is below or above the permissible threshold value, respectively, whether the trailer exceeds the maximum allowable weight or not. In response to an exceedance of the allowable threshold value, the driver cannot put the vehicle into operation, respectively not set it in motion, and he/she must reduce the weight bearing on the trailer. If the measured load on the coupling unit of the towing vehicle, respectively the recorded force, and/or a physical quantity determined therefrom are/is below the permissible threshold value, the vehicle may then be set into operation, and the driver knows that the trailer is not overloaded. Thus, a source of danger is advantageously systematically and intentionally eliminated before the start of travel, whereby dangerous situations caused by overloading of the trailer may be avoided, and the risk of accident may be reduced. The monitoring function of the measuring device advantageously makes it possible to virtually rule out any excessive overloading of the vehicle system, respectively of the entire trailer coupling assembly, and of the rear axle of the towing vehicle. Generally, the assembly according to the present invention is a helpful device for the driver that improves safety and reliability in daily operation in that the driver, in particular already before the start of travel, may be warned about overloading of the trailer, thereby making it possible to reduce the risk of accident.

It is particularly advantageous that the measuring device performs the force measurement upon switching on of an ignition and/or during the vehicle operation and/or when the towing vehicle is at standstill; the measuring device activating the vehicle immobilizer only in response to a detected vehicle standstill. The load acting on the coupling assembly is hereby preferably permanently controlled in response to the force measurement already at the beginning of the procedure for starting the vehicle and during the entire operation thereof. The measuring device is advantageously designed to render the vehicle's immobilizer subordinate to the active vehicle operation during travel, respectively not activatable during travel. The measuring device may then merely actively intervene in the vehicle's engine control when the vehicle is at standstill. The initial start-up and/or a setting in motion of the towing vehicle may be thereby prevented already before the start of travel upon detection of an overloading of the towing vehicle-side coupling unit. Thus, regardless of the load level on the towing vehicle-side coupling unit, the vehicle immobilizer does not actively intervene in the driving situation during travel.

One advantageous embodiment of the present invention provides that the measuring device be able to compare the recorded values to the maximum values permitted for a towed weight and/or a drawbar load that is specified for the towing vehicle. This advantageously makes it possible for actually occurring values for a towed weight and/or a drawbar load to be evaluated at standstill and during vehicle operation in order to prevent overload-induced damage to the trailer coupling assembly, respectively to the vehicle. Moreover, dangerous driving situations caused by overloading of the trailer may be avoided. In addition, the measuring device may be advantageously adapted to different vehicles, conditions, threshold values and other parameters.

To prevent the towing vehicle from starting and/or moving, another advantageous embodiment of the present invention provides that the vehicle immobilizer be connected via an appropriate interface to an ignition device and/or a fuel feed device and/or an engine control unit and/or a pedal device. This advantageously enables the control signals to be directly transmitted to a blocking device connected upstream of the engine, allowing the control signals to be rapidly converted and the immobilizer to be rapidly activated.

Another advantageous embodiment of the present invention provides that the measuring device be able to inform the driver of the towing vehicle of the recorded values via at least one output unit. As a result, the driver may be continually informed about the current state of the load on the trailer coupling assembly before and during travel. Accordingly, the driver may adapt his/her driving style to the load values indicated on the output unit. Any given optic, acoustic, and/or haptic output devices may be used as an output unit. Thus, for example, screen displays and/or voice instruction systems already present in the vehicle may be used for outputting the actual load values.

It is particularly advantageous that the measuring device be able to output a warning to the driver of the towing vehicle via the at least one output unit prior to activation of the vehicle immobilizer. This advantageously makes it possible for information about the load state of the trailer coupling assembly to always be output in a timely fashion to the driver, in particular prior to an initial start-up and/or a setting in motion of the towing vehicle. Thus, an uninformed driver may also be alerted about an improper loading of the trailer and be informed, respectively prompted by the output unit to rectify this state before initiating travel. The warning may also be optically, acoustically and/or haptically output via output systems already present in the motor vehicle.

Another advantageous embodiment of the present invention provides that the measuring device be able to output a warning to the driver of the towing vehicle via at least one output unit even during travel operation in response to the values recorded during the driving operation exceeding the permissible maximum values for the towed weight and/or the drawbar load. The driver may advantageously receive information in real time that the maximum load is critical in the case of dynamic driving style, and his/her driving behavior should be altered, and/or the speed and/or the load should be reduced. Thus, the driver may initiate countermeasures in a timely fashion against pitch and/or roll behavior of the trailer and thereby avoid dangerous situations.

In another advantageous embodiment of the present invention, the measuring device may transmit the recorded values to an evaluation and control unit that generates actuating signals for at least one stabilization function of the towing vehicle. Here, the advantage is derived that the measurements and evaluations of the actuating signals of the towing vehicle may be permanently carried out during the travel operation in order to ensure a reliable travel operation of the vehicle system. To avoid an escalation of the driving situation in the case of overloading of the trailer, the recorded values may be directly evaluated in order to immediately introduce stabilization measures, thereby making it possible to enhance the reliability and safety of the towing vehicle.

One preferred realization of the assembly according to the present invention provides that the towing vehicle-side coupling unit be permanently or detachably coupled to the structure of the towing vehicle; in the case of a detachable design, the towing vehicle-side coupling unit being coupled via the measuring device to a structure of the towing vehicle. Depending on the model, the measuring device may advantageously be configured within the structure or within the coupling unit in the case of a towing vehicle-side coupling unit that is permanently joined to the structure of the towing vehicle. A plurality of options are advantageously hereby derived for integrating a measuring device in the towing vehicle, as well as for a significant savings of material and costs, given a small space requirement, as well as a low weight of the coupling unit according to the present invention, since the need for additional fastening elements is eliminated.

Another advantageous embodiment of the present invention provides that the measuring device be designed as an iBolt unit which has at least one sensor having absolute measuring capability. The embodiment according to the present invention of the measuring device renders possible the use of a measuring principle, respectively of a force-measuring element already used in motor vehicles without incurring any significant additional outlay, since a conventional, commonly used iBolt unit may be used for this purpose. The use of such a force-measuring unit makes it possible to record a force in the vertical direction; torques, as well as forces about the two horizontal directions being able to be compensated and suppressed. Thus, an accurate determination of the force acting in the coupling unit during travel operation is obtained. Without entailing any substantial outlay, the iBolt unit is suited for retrofitting. Using an iBolt unit preferably saves development costs since no significant modifications to existing coupling units are needed.

One exemplary embodiment of the present invention is illustrated in the drawing and will be explained in greater detail in the following description.

BRIEF DESCRIPTION OF THE DRAWINGS

FIG. 1 schematically shows a detail of a lateral view of a towing vehicle including an exemplary embodiment of an assembly according to the present invention for coupling a towing vehicle to a trailer that features a measuring device coupled to a vehicle immobilizer.

FIG. 2 shows a block diagram of the towing vehicle from FIG. 1 including the assembly according to the present invention for coupling the towing vehicle to a trailer.

DETAILED DESCRIPTION

FIGS. 1 and 2 each show a towing vehicle 10 including an exemplary embodiment of an assembly according to the present invention for coupling towing vehicle 10 to a trailer. The coupling assembly includes a towing vehicle-side coupling unit 14 and a trailer-side coupling unit (not shown). As is readily apparent from FIGS. 1 and 2, assigned to towing vehicle-side coupling unit 14 is a measuring device 18 that records and analyzes the force acting thereon in at least one direction 16. Alternatively, measuring device 18 for recording and analyzing the force acting on towing vehicle-side coupling unit 14 may also be assigned to the trailer-side coupling unit.

To prevent an overloading of a vehicle system made up of towing vehicle 10 and a trailer, measuring device 18 is coupled in accordance with the present invention to a vehicle immobilizer 22 that prevents towing vehicle 10 from starting and/or being set in motion in response to the force recorded by measuring device 18 and/or a physical quantity derived therefrom exceeding a predefined threshold value. A force acting on towing vehicle-side coupling unit 14 of the assembly is preferably recorded in vertical direction 16. To this end, measuring device 18 is configured within towing vehicle-side coupling unit 14 or within a holding device 30 that is provided for towing vehicle-side coupling unit 14 and is joined to a structure 12 of towing vehicle 10.

Towing vehicle-side coupling unit 14 is permanently or detachably coupled to structure 12 of towing vehicle 10; in the case of a detachable design, towing vehicle-side coupling unit 14 being coupled via measuring device 18 to a structure 12 of towing vehicle 10. Another position of measuring device 18 or another connection of measuring device 18 to structure 12 of towing vehicle 10 is also self-evidently conceivable. Alternatively, measuring device 18 may also be integrated in the trailer-side coupling unit having a permanent or detachable design, so that measuring device 18 is configured within trailer-side coupling unit or within a holding device that is provided for trailer-side coupling unit and is joined to a structure of the trailer. Likewise, in the case of a detachable design, towing vehicle-side coupling unit may be coupled via measuring device 18 to the structure of the trailer. Detachable coupling unit is preferably equipped with a quick-connect coupling (not shown here).

Measuring device 18 performs the force measurement upon switching on of an ignition and/or during travel and/or during standstill of towing vehicle 10; measuring device 18 activating vehicle immobilizer 22 only in response to a detected vehicle standstill.

Measuring device 18 compares the recorded values to the maximum values permitted for a towed weight and/or a drawbar load that are specified for towing vehicle 10. When the maximum value for a towed weight and/or a drawbar load on towing vehicle-side coupling unit 14 is exceeded, a logic device, for example, an evaluation and control unit, ensures that towing vehicle 10 cannot be set in operation, respectively cannot begin to move. For this purpose, measuring device 18 is linked to a control unit, for example, that may have an engine control unit (ECU) 32, airbag control unit or domain control unit (DCU) design, it being possible for the described functionality to also be integrated into other control units.

To prevent towing vehicle 10 from starting and/or moving, in the illustrated exemplary embodiment, vehicle immobilizer 22 is coupled to an ignition device 34 and/or a fuel feed device 28 and/or to engine control unit 32 and/or to a pedal device 26 of towing vehicle 10. Thus, to prevent towing vehicle 10 from starting and/or moving, vehicle immobilizer 22 may interrupt the ignition, for example, cut off engine 20, and/or interrupt, respectively prevent the fuel supply.

Measuring device 18 advantageously indicates the recorded values to the driver of towing vehicle 10 via at least one optic, acoustic, and/or haptic output unit 24. Thus, a convenience function is derived that indicates the recorded values to the driver in real time preferably on a display or screen and/or by outputting them via a voice output system, so that the driver always knows whether the recorded value is above or below the predefined threshold value, and whether he/she must reduce or even add to the load. Thus, the weight by which the threshold value is exceeded, respectively undershot may also be directly output to the driver.

Via the at least one output unit 24, measuring device 18 preferably outputs a warning to the driver of towing vehicle 10 prior to activation of vehicle immobilizer 22. The warning may be issued optically via a display, respectively a screen display, acoustically via a voice instruction system, respectively a tone generator, or haptically by introducing vibrations into the steering wheel and/or pedal device 26, for example. Moreover, in the illustrated exemplary embodiment, measuring device 18 outputs a warning to the driver of towing vehicle 10 via the at least one output unit 24 in response to the values recorded during the driving operation exceeding the permissible maximum values for the towed weight and/or the drawbar load. In the continuous measuring operation during travel, the maximum allowed value may be temporarily exceeded, for example, by the pitching of the vehicle system composed of towing vehicle 10 and the trailer. If this occurs too often, the driver of towing vehicle 10 may receive a warning that the maximum load is critical to the dynamic behavior of the vehicle system and should be reduced.

In addition, measuring device 18 is able to transmit the recorded values to an evaluation and control unit that generates actuating signals for at least one stabilization function of towing vehicle 10.

Measuring device 18 is preferably designed as an iBolt unit that has at least one sensor having absolute measuring capability. A force acting on towing vehicle-side coupling unit 14 is actively and preferably continuously recorded.

What is claimed is:

1. An assembly for coupling a towing vehicle to a trailer, comprising:
    a towing vehicle-side coupling unit;
    a trailer-side coupling unit;
    a measuring device for performing a force measurement that includes recording and analyzing a force acting on the towing vehicle-side coupling unit in at least one direction, the measuring device being assigned to the towing vehicle-side coupling unit; and
    a vehicle immobilizer coupled to the measuring device and for preventing the towing vehicle from at least one of starting and being set in motion in response to at least one of the force recorded by the measuring device and a physical quantity derived therefrom exceeding a predefined threshold value.

2. The coupling assembly as recited in claim 1, wherein the measuring device performs the force measurement at least one of (1) upon switching on of an ignition and (2) at least one (a) during a travel operation and (b) during standstill of the towing vehicle, the measuring device activating the vehicle immobilizer only in response to a detected vehicle standstill.

3. The coupling assembly as recited in claim 1, wherein the measuring device compares recorded values to maximum values permitted for at least one of a towed weight and a drawbar load that is specified for the towing vehicle.

4. The coupling assembly as recited in claim 1, wherein, to prevent the towing vehicle from at least one of starting and moving, the vehicle immobilizer is coupled to at least one of an ignition device, a fuel feed device, an engine control unit, and a pedal device.

5. The coupling assembly as recited in claim 1, wherein the measuring device indicates recorded values to a driver of the towing vehicle via at least one output unit.

6. The coupling assembly as recited in claim 5, wherein, prior to activation of the vehicle immobilizer, the measuring device outputs a warning to a driver of the towing vehicle via the at least one output unit.

7. The coupling assembly as recited in claim 6, wherein, during a travel operation, the measuring device outputs a warning to the driver of the towing vehicle via the at least one output unit in response to values recorded during a driving operation exceeding a maximum permissible value for at least one of a towed weight and a drawbar load.

8. The coupling assembly as recited in claim 1, wherein the measuring device transmits recorded values to an evaluation and control unit that generates actuating signals for at least one stabilization function of the towing vehicle.

9. The coupling assembly as recited in claim 1, wherein the towing vehicle-side coupling unit is one of permanently and detachably coupled to a structure of the towing vehicle, wherein in the case of a detachable design, the towing vehicle-side coupling unit is coupled via the measuring device to the structure of the towing vehicle.

10. The coupling assembly as recited in claim 1, wherein the measuring device is a force sensing unit that has at least one sensor having an absolute measuring capability.

\* \* \* \* \*